7677X
P. Trajetta,
Guitar,
Patented July 22, 1833.
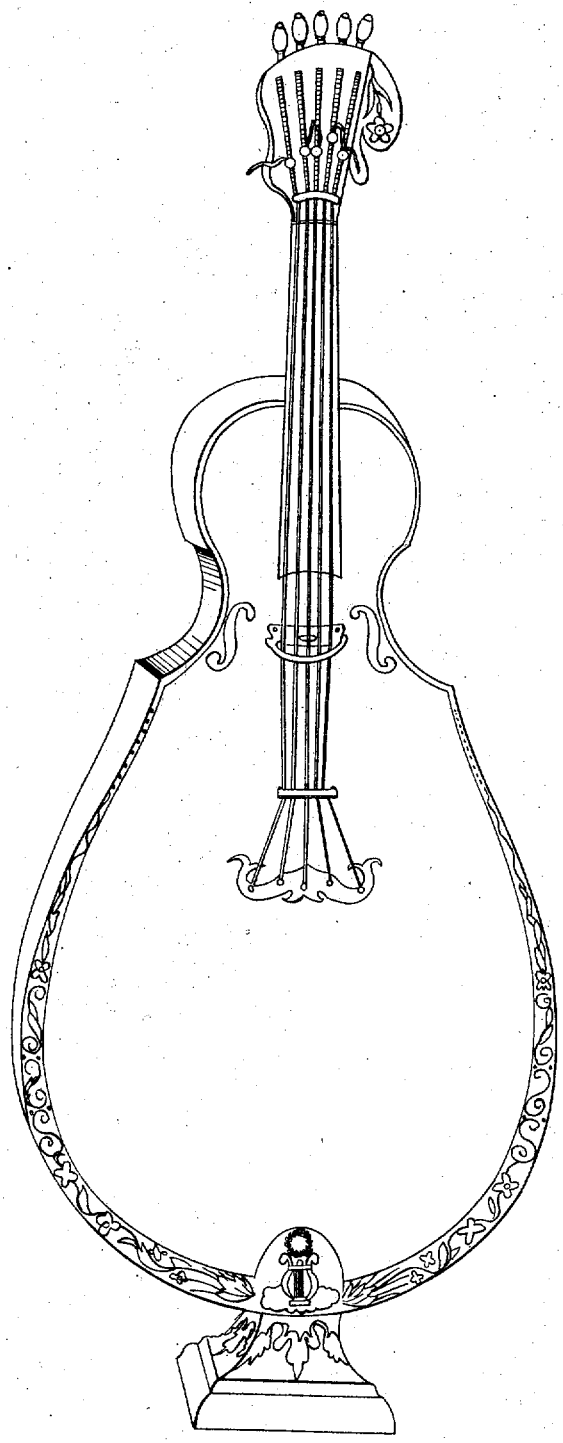
AM. PHOTO-LITHO. CO. N.Y. (OSBORNE'S PROCESS)

7/22/1833 7677X

July 22. 1833

Philip [illegible]'s Plettro Lira
Letters Patent

The Schedule referred to in these Letters Patent and making part of the same containing a description in the words of the said Philip [illegible] himself of his improvement in the musical instrument called Plettro Lira.

---

The plettro Lira is a portable or may be made a stationary musical instrument, it is made of wood & may be made of other materials, it is flat and may be curved it is shaped according to the annexed drawing & may be made of different shapes, to be played with a bow on strings inserted in & the tension thereof sustained by the sounding board, & passing over a bridge the distance of which from the nut is short in comparison with the body of the instrument. It may be construct ed of any large size, & yet its sound is thro' very full, or of the highest pitch, or may be of a lower one (2°) When larger strings than those of violin are applied to it, & more length is given to them from the bridge to the nut, in the known proportions, its pitch may be brought to that of the alto. By the application of larger & longer strings, & giving to them a greater length from the bridge to the nut, its pitch may be brought to that of the bass & double bass, with bodies uncommonly large & of different forms from those of the said instruments (3) The body of the plettro lira is of wood & may be made of metal & other materials. Its form may be vari ed according to fancy. Its handle may be made broad or narrow large or small. Its varnish may be of oil or of other kinds. It is tuned by fifths, & may be tuned by fourths or other intervals. It has strings of catgut, as the violin & alto, to be played with the vi olin bow, or the one adapted to it, & in addition may have wire strings of different size & length, inserted in the sounding board with pegs & other contrivances, or they may be tied on strung on to a tail piece, or to similar things. The screws by which

16117X they are stretched are of iron & may be of different materials
ending in simple or fancy turns. The finger board is of wood
and may be of different materials & form. The bridge is of wood
& may be varied in form & material. The hoops in one part of the
instrument are wider than in another & may be made wider
or narrower in different parts or all alike (4) The holes of the
plettro lira are in the shape of an S. and may be circular, or of
any other figure. The instrument has two holes & may have
none, or but one smaller or larger. They are placed at the sides
& may be placed in the middle of the sounding board or in an
other part of the instrument. It has one sounding post & may
have more (5) The plettro lira may be placed on a portable base
of different construction height & breadth. It may be placed on a
permanent base so as to be played standing, & even by performers
mounted on steps or foot stools. It may have a capo tasto keys
pedals & other contrivances to govern the intervals of the strings from
finger to finger. (6) The names which distinguish the different
sizes of the instrument are the following. Plettro lira violin or
small size Ditto alto 2d size. Ditto violin & alto 3d size called
otherwise Ladies Plettro lira with four violin strings & one alto
Ditto basso 4th size Ditto contra basso 6th size. (7) The applying of steel
strings to a large sounding board by inserting them in it, or sus-
pending them over it & giving to them a smaller relative distance
from the bridge to the nut (as in the plettro lira) which makes
a large stringed instrument produce the high pitch of the viol-
in, a much fuller sound & of the kind required to perform the
principal part in music & which gives to the low pitches a
fuller sound facilitating also the means of execution is claim-
ed by your petitioner as his invention, & he verily believes him-
self to be the true & original inventor of the above instrument
as herein specified (8) Concerning the use of the plettro lira, it
is to be observed that the way of holding the violin not being
calculated for females to perform on it they are deprived of its — an accompaniment to their voices. The manner of holding the plettro lira is calculated for females as well as males. When played by females it is placed at the side, the lower part of the plettro lira resting on the floor. Small plettro lira are placed by men between the knees. (9) The intention of your petitioner which led him to the invention of the plettro lira was to enable performers of music to accompany & support their voices in a choir upon a stringed ~~instrument~~ capable of producing long sounds with their modifications of force & likewise to enable male performers to lead a choir with a stringed instrument easy to tune as well calculated as the violin for leading & whose manner of holding is more congenial than that of the violin with the dignity of the place of performance Witnesses
William Milnor
D. Voorhees & Hoogeland Philip Trajetta Dr in portfolio 1000 words

[illegible]